(12) United States Patent
Allen

(10) Patent No.: US 6,233,408 B1
(45) Date of Patent: May 15, 2001

(54) IMAGE FORMING DEVICE WITH TOKEN PRINTING CAPABILITIES

(75) Inventor: Loretta E. Allen, Hilton, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/501,748

(22) Filed: Feb. 10, 2000

(51) Int. Cl.[7] .................................................. G03G 15/00
(52) U.S. Cl. .............................. 399/8; 399/15; 399/24; 705/14
(58) Field of Search ........................ 397/1, 9, 24, 25, 397/27, 81; 347/7, 19; 705/14, 30; 399/15, 8

(56) References Cited

U.S. PATENT DOCUMENTS

| | | |
|---|---|---|
| 4,922,294 | 5/1990 | Nakagami et al. . |
| 5,068,806 | 11/1991 | Gatten . |
| 5,128,752 | 7/1992 | Von Kohrn . |
| 5,305,199 | 4/1994 | LoBiondo et al. . |
| 5,488,423 | 1/1996 | Walkingshaw et al. . |
| 5,500,681 | 3/1996 | Jones . |
| 5,682,140 | 10/1997 | Christensen et al. . |
| 5,691,750 | 11/1997 | Edwards . |
| 5,717,974 | 2/1998 | Park . |
| 5,812,156 | 9/1998 | Bullock et al. . |
| 5,937,225 | 8/1999 | Samuels . |
| 6,102,508 * | 8/2000 | Cowger .................................. 347/7 |

* cited by examiner

Primary Examiner—Joan Pendegrass
(74) Attorney, Agent, or Firm—Frank Pincelli

(57) ABSTRACT

A method and an electronic image forming device having at least one replaceable consumable. At least means is provided for automatically sensing when the replaceable consumable in the mage forming device reaches a predetermined condition. A software program automatically initiates an offer to the user of the electronic image forming device when the predetermined condition is reached. The offer may include a discount for the purchase of a new consumable or related item. The software program may also initiate communication with a remote site for ordering of a replaceable consumable.

5 Claims, 4 Drawing Sheets

*This Certificate Entitles the bearer to a savings Off the purchase of a Brandname replacement cartridge Model XXX-XX*

ISBN 0-316-17791-1

9 780316 177917

90000

*Money Saving Token Offer*

ATTENTION: YOU ARE RUNNING LOW ON <u>COMPONENT A</u>.
BASED ON YOUR CURRENT CONSUMPTION RATE, YOU WILL BE
COMPLETELY OUT OF <u>COMPONENT A</u> ON OR ABOUT <u>DATE</u>.
IT IS RECOMMENDED THAT YOU USE ORIGINAL MANUFACTURE
REPLACEMENT COMPONENTS IN YOUR DEVICE.
YOU CAN USE THIS FORM TO AUTOMATICALLY ORDER THE
COMPONENTS YOU NEED AT A SUBSTANTIAL SAVINGS OVER
REGULAR RETAIL PRICES.
SIMPLY FILL OUT THE INFORMATION BELOW, AND YOUR PARTS
WILL AUTOMATICALLY BE SENT TO YOU.

COMPLETE THE FOLLOWING

NAME: 
ADDRESS: 
CITY: 
ZIP CODE: 
DAYTIME PHONE: 
E-MAIL ADDRESS: 
CREDIT CARD NUMBER: 
MAIL TO: XYZ COMPANY

Send Email

TERMS AND CONDITIONS: TOKEN REQUESTS MUST BE RECEIVED BEFORE 12/31/02 AND CLAIMS ARE SUBJECT TO VERIFICATION. OFFER VOID WHERE PROHIBITED, TAXED OR RESTRICTED.

*FIG. 4*

IMAGE FORMING DEVICE WITH TOKEN PRINTING CAPABILITIES

FIELD OF THE INVENTION

The present invention relates to image forming electronic devices and more particularly to an apparatus and method for informing the operator that an image forming device that one or more consumables components of the apparatus is approaching the end of its life, and providing the user with the proper information and also an incentive to replace said consumables with the recommended original equipment manufacture (OEM) replacement parts.

BACKGROUND OF THE INVENTION

Most image forming electronic devices, such as facsimile machines, printers, copiers, and most recently home photo printers, utilize any number of consumables, e.g. toner, ink, ribbon, receiver media, etc. which need to be replaced at the end of their lives. Today, more and more of these electronic devices are designed to be portable requiring a DC power supply. In this situation, the power supply is also a consumable, and needs to be replaced at the end of its service life.

The service life for a consumable is generally designed by the manufacturer and is monitored by the print device in which it operates. Optimally, near the end of the consumable's life, the print device displays a message to the user on a display of the device or on a host device, such as a personal computer, concerning the status of the consumable. The message is generally limited to nothing more than a "toner low" or "paper out" indication.

Typically, image forming electronic devices are packaged for sale so that all the components required to form an image are included in the package. And because equipment manufacturers design equipment for optimal performance using particular consumables having specific designated requirements, these particular consumables are also included in the packaging.

Also included in the package of the image forming electronic device is a User's Manual which instructs the user how to assemble the components of the device, and how to successfully form images using the device. Usually included at the end of the User's Manual, or as a separate document, is a "Statement of Limited Warranty". This statement includes, but is not limited to, information regarding covered repair services on the device if the device fails to operate within a certain period of time from date of purchase. The warranty may not include services for failure caused by use of other than the properly designed consumables in the device.

Replacement OEM consumables for image forming electronic devices are available for purchase from a wide selection of retail centers, as well as mail order from the Internet. In addition, there may be a family of similar devices each having the same or different requirements. Also available for purchase are numerous non-OEM replacement consumables, which are typically available to the consumer at a lower cost.

This invention provides a method and apparatus for communicating with the user of an image forming electronic device, and providing the user with an incentive to purchase and replace exhausted consumable with OEM parts or authorized parts. The invention advantageously utilizes sensors currently present in the image forming electronic device, which are typically built into the printing device. When the status indicator senses that a particular consumable is exhausted or nearing exhaustion, the device automatically prints a hard copy of a token which is redeemable on the purchase of that particular OEM consumable. The token will give the user an incentive to purchase an OEM product in the form of cash savings vs. an after market product.

In one embodiment, this is accomplished using a software program implementation within the image forming electronic device. In addition to, or in lieu of, a traditional low-level status light indicator, the low-level sensor sets a flag within the software program of the device, which prompts the user to make a decision about printing a token. The prompt can be in the form of a dialog box that is displayed on a screen of a computer that is connected to the electronic printing device. A "yes" response causes one or more pages to be printed by the device, a "no" response calls for no action. If the user selects the "yes" option, token information is printed on these pages. Alternately, the token can be printed automatically without requiring any action from the user. The token information contained in these pages can be completely pre-stored within a memory device such as a ROM (read only memory) or NVRAM (non-volatile random access memory). The pages can be hand carried by the user and redeemed at a place of purchase for the consumables.

The present invention provides a printing apparatus which senses the level of its consumables, indicates when the level is low, and offers the user an opportunity to purchase OEM replacement consumables at a reduced cost.

The present invention also provides an incentive for the user to purchase OEM replacement consumables.

SUMMARY OF THE INVENTION

The above, and other objects, advantages and novel features of the present invention will become more apparent from the accompanying detailed description thereof when considered in conjunction with the following drawings.

In accordance with one aspect of the present invention there is provided an electronic image forming device comprising:
 a. at least one replaceable consumable;
 b. at least one sensor for automatically sensing when the replaceable consumable reaches a predetermined condition, and
 c. a software program for initiating printing of a token by the image forming device when the predetermined condition is reached.

In accordance with another aspect of the present invention there is provided an electronic image forming device comprising:
 a. at least one replaceable consumable;
 b. at least one sensor for automatically sensing when the replaceable consumable reaches a predetermined condition,
 c. a status indicating device responsive to the one sensor for indicating when the replaceable consumable has reached the predetermined condition; and
 d. an activating device for a user to activate the image forming device to print a token.

In accordance with still another aspect of the present invention there is provided a method of notifying a user that a particular replaceable consumable may need to be purchased for use with an electronic imaging device, comprising the steps of:

a. sensing when the replaceable consumable has reached a predetermined condition; and b. printing a token for the purchase of the replaceable consumable whenever the predetermined condition is reached.

In still another aspect of the present invention there is provided a method of notifying a user that a particular replaceable consumable may need to be purchased for use with an electronic imaging device, comprising the steps of:

a. sensing when the replaceable consumable has reached a predetermined condition;

b. automatically contacting a remote site when replaceable consumable has reached a predetermined condition and communicating this condition to the site;

c. the site controlling printing a token at the electronic imaging device for the purchase of a new replaceable consumable.

In accordance with yet another aspect of the present invention there is provided a method of notifying a user that a particular replaceable consumable may need to be purchased for use with an electronic imaging device, comprising the steps of:

a. sensing when the replaceable consumable has reached a predetermined condition;

b. indicating when the replaceable consumable reaches the predetermined condition; and c. enabling the user to print a token for purchase of the replaceable consumable when the predetermined condition is reached.

In accordance with still yet another aspect of the present invention there is provided a computer software product comprising a computer readable storage medium having a computer program which when loaded into a computer of an image forming device causes the computer to perform the following steps:

a. sensing when the replaceable consumable has reached a predetermined condition in the image forming device; and b. printing a token for the purchase of the replaceable consumable whenever the predetermined condition is reached.

In accordance with another aspect of the present invention there is provided a computer software product comprising a computer readable storage medium having a computer program which when loaded into a computer of an image forming device causes the computer to perform the following steps:

a. sensing when the replaceable consumable has reached a predetermined condition;

b. automatically contacting a remote site when replaceable consumable has reached a predetermined condition and communicating this condition to the site;

c. the site controlling printing a token at the electronic imaging device for the purchase of a new replaceable consumable.

BRIEF DESCRIPTION OF THE DRAWINGS

In the detailed description of the preferred embodiments of the invention presented below, reference is made to the accompanying drawings in which:

FIG. 4 is sample of yet another token made in accordance with the present invention.

DETAILED DESCRIPTION OF THE INVENTION

Figure 1:
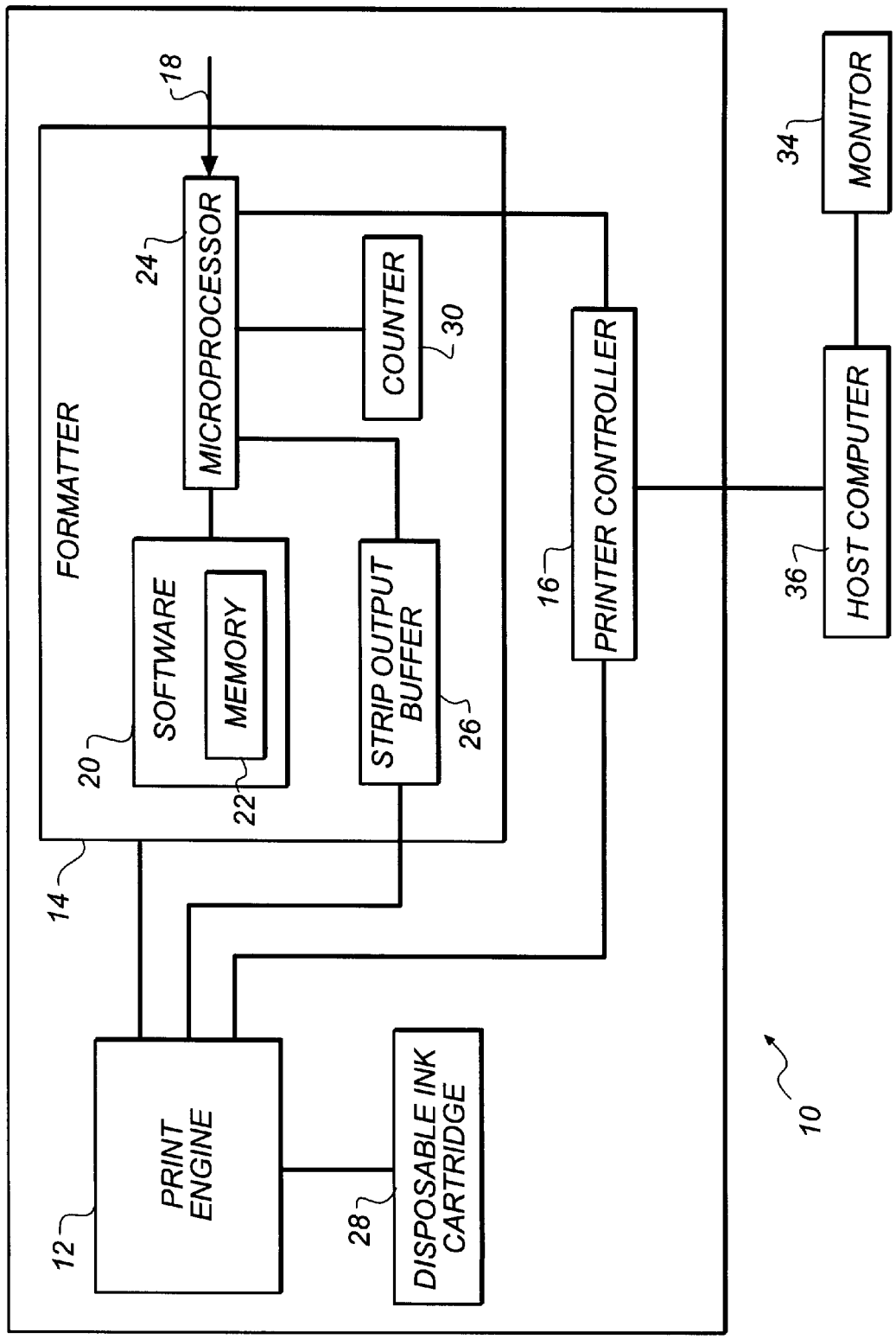
FIG. 1 is a schematic representation of an image forming electronic device comprising the consumable end of life messaging feature and token printing capabilities.

Referring now to the figures, an image forming electronic device 10 is shown in schematic representation in FIG. 1. While this representation is indicative of a inkjet type printer, it should be understood that the invention is not so limited and is applicable to other image forming electronic devices such as facsimile machines, thermal printers, laser printers, LED printers, LCD printers, and virtually any other kind of image forming electronic device which uses consumable components to create the images.

The term "image forming electronic device" for the purposes herein, shall be used to describe any image forming electronic device.

Consumable components can be defined as such items that are consumed in use during the printing operation or general operation of the device. Often the consumables are typically pre-measured and housed in their own container or cartridge. The type of printer designates the type of consumables that are required by the printer. In many cases, the printer requires at least two separate consumable components to make an image, some sort of donor material, and some sort of receiver material. Several examples of donor material can be ink, thermal ribbon, or electrostatically charged particles, etc. and receiver material can be film, paper or plastic coated paper, etc. Generally, printers today run on AC, but there is a growing demand for portable electronic components. To satisfy this demand, portable printers that run on DC are now available, and accordingly a portable power supply can be added to the list of consumables.

Inkjet printers typically require a cartridge containing ink. If the printer is of the portable type, it may also require batteries or a power pack. Thermal printers typically require a cartridge containing a donor ribbon and a cartridge containing receiver media. In the case of a thermal facsimile machine, only a cartridge containing media is required since the media itself contains the donor chemistry.

The printer/image forming device 10 includes a digital print engine 12 to print on media 38, such as paper, using a disposable ink cartridge 28. The printer further includes a formatter 14, a printer controller 16, and an input 18 for receiving data to be printed. The formatter 14 provides the supporting electronic control for the print engine 12. Additionally, the formatter 14 interprets signals received from the print engine 12 such as a low ink level signal which is used in this embodiment to trigger a visual message to the user that the level of ink is nearing exhaustion. The formatter 14 comprises software 20 containing memory 22, a microprocessor 24, a strip output buffer 26, and a counter.

In the embodiment illustrated, the disposable ink cartridge 28 is of the type that includes an ink supply and a number of heater resistors. In order to track ink usage of the ink cartridge 28, the formatter 14 counts print head dots to be fired and updates a cumulative count from a counter 30 into memory 22 which is a non-volatile RAM (NVRAM) at the end of each page printed by the printer 10. The method of counting dots and managing ink level data is described in detail in U.S. Pat. No. 5,691,750. This information is used to determine when the ink supply in the cartridge is near exhaustion. Thus, prior to actually running out of ink, the operator is advised of the need to replace the ink cartridge prior to actually exhausting the ink therefrom. It is to be under any appropriate monitoring and/or sensing method or device may be employed for monitoring of the item to be exhausted. This may include the counting of the number of pages that have been printed thereon by the image forming device 10.

Figure 3:
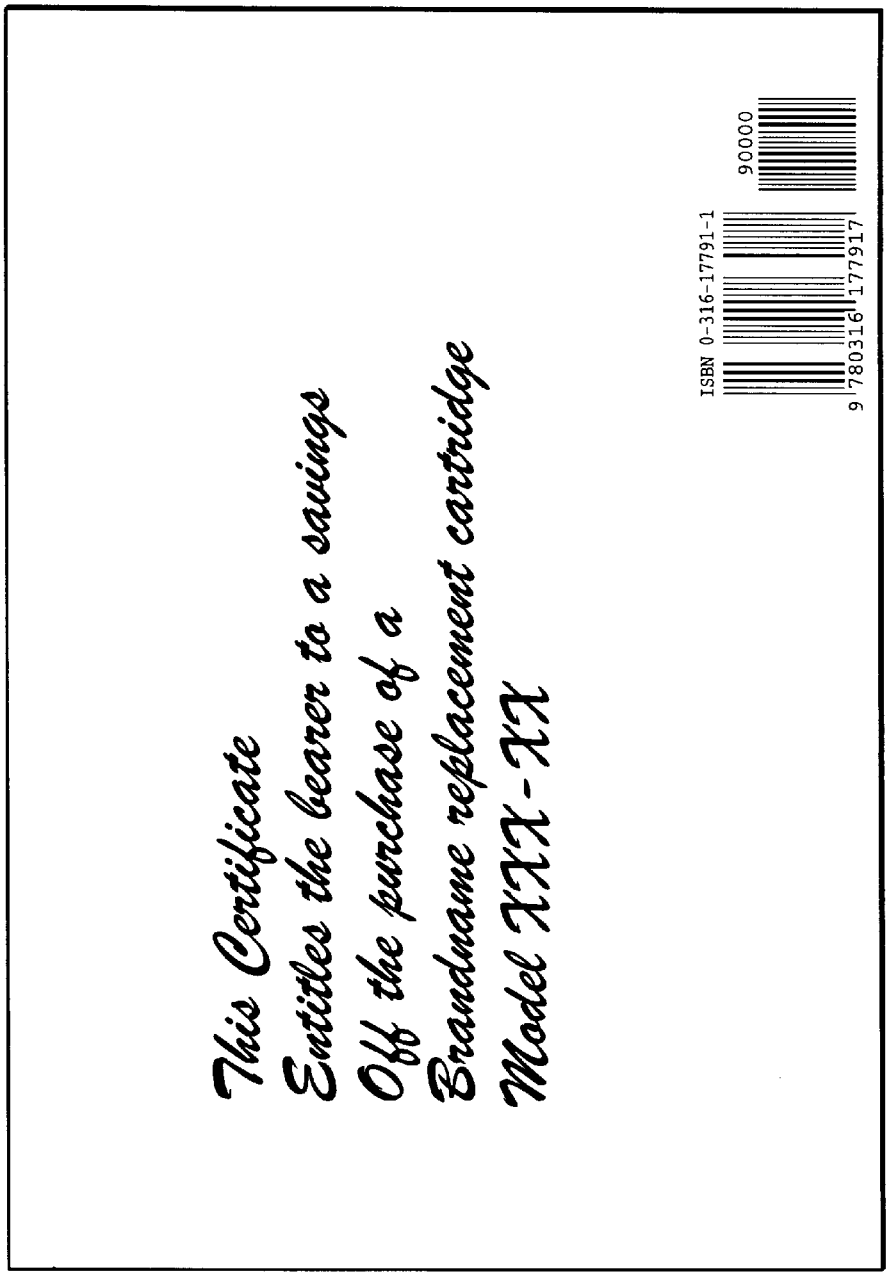
FIG. 3 is a sample of a printed token.

A low level status indicator 25 such as light emitting diodes (LED's) or a LCD is provided on the printer 10 or on the display panel of printer 10 for low level ink indications. When a "low ink" level is sensed by a low level sensor 27 in the formatter 14, the low level status indicator 25 is energized communicating to the operator that the ink level in the disposable ink cartridge 28 is at or below a predetermined set point, and nearing exhaustion. The sensor 27 may be of any suitable type capable of monitoring the supply of ink in the cartridge. In addition to the level status indicator 25, the low-level sensor 27 sets a flag within software program 20 of the printer 10. When the printer 10 determines that the level of ink is exhausted or nearing exhaustion, the printer 10 automatically prints data in the form of a token 32 (see FIG. 3). The token 32 is an incentive to purchase a particular product to replace the exhausted item. In the embodiment illustrated the token is in the form of coupon which provides cash savings on the purchase of a designated replacement item. FIG. 3 shows an example of the printed token 32. Alternately, a message can be displayed on the display panel prompting the user to make a decision about their desire to print the token 32. An activating device, such as selection buttons adjacent the display panel, enables the user to input their preference. The user is asked to select "yes" to print the token 32, or "no" for no action. A "yes" selection causes the printer 10 to automatically print a redeemable token 32 on the media within the printer 10. Data regarding tokens 32 are stored in memory 22 of the software program 20 of print engine 12 so that the appropriate token can be printed. Since the device may have more than one consumable, which may be depleted at a different rate, the software is pre-programmed to print the appropriate token. In addition to, or in lieu of, a traditional low-level status indicator 25 on the display panel of printer 10, a signal can be sent to a monitor 34 of a host computer 36.

The above description is based on, but not limited to, a disposable ink cartridge in an inkjet printer. It is well known that there are other types of sensing systems in an inkjet printer as in other types of printers as well. For example, a media sensor for sensing when the media being printed on is approaching exhaustion, and a battery sensor for battery operated units to sense when the energy level remaining in the battery or batteries is nearing exhaustion. In all cases, when the sensor reaches a predetermined set point, a message is given to the user to indicate the status of the consumable. A token is either printed automatically for the user, or the user is given an option whether or not to print a token.

Figure 2:
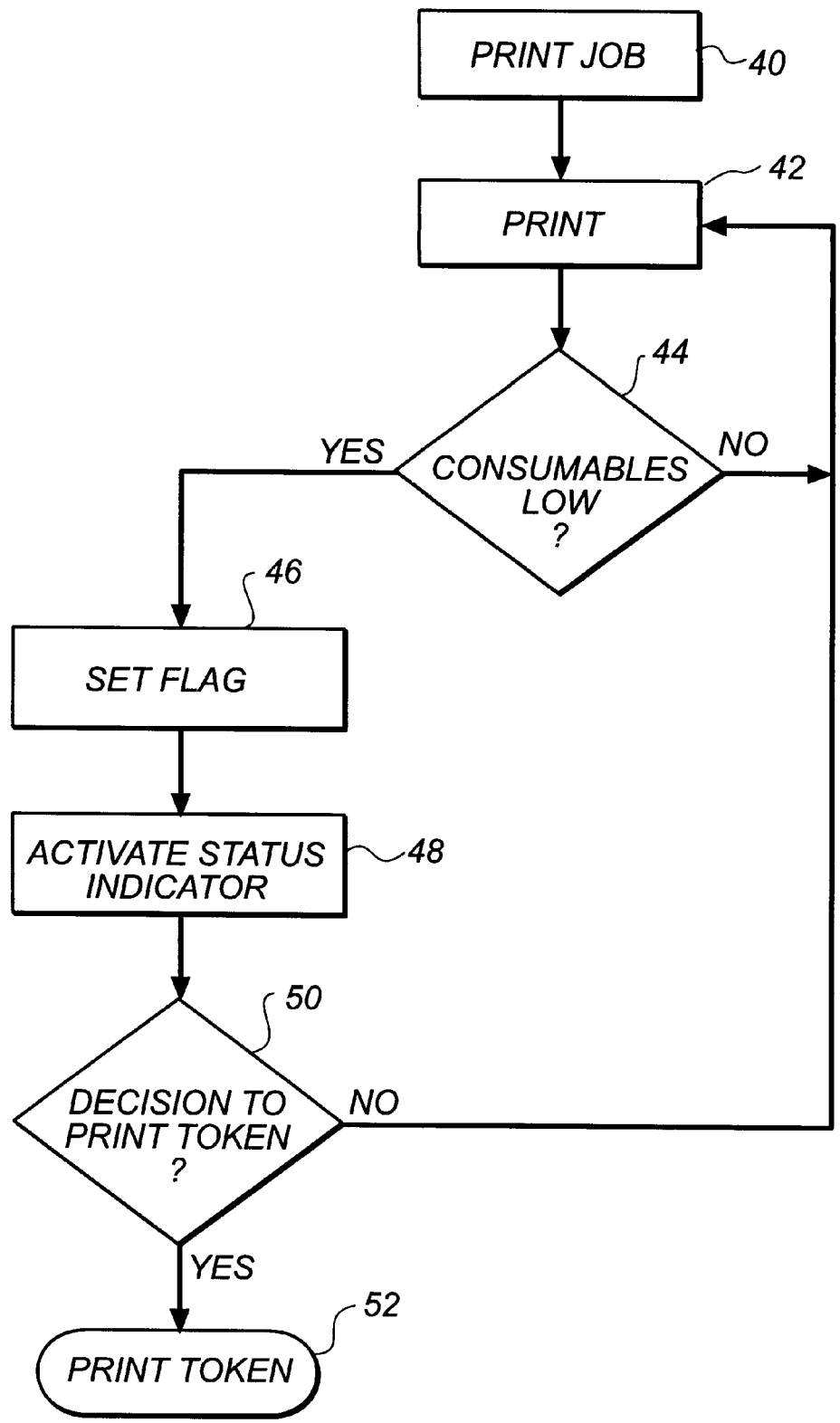
FIG. 2 is a flow chart showing one possible software program implementation of the invention.

Referring to FIG. 2 there is illustrated a flow chart as to an example of the operation of a software program that has been preprogrammed in to the software 20 of image forming device 10 in accordance with the present invention. At step 40, a print job is request. At step 42 the printer request is received and analyzed by the software in the computer. At step 44 it is determined if the one of the consumables is low. If not, the printing operation continues normally. If the answer is Yes, a flag at step 46 is set. The step 48 causes an indicator to advise the user of the low consumable condition. This may be a light indicator or a screen display providing details of the low consumable condition and the options presented to the user. At step 50 the user decides to print the token. If no, the printing operation runs in its normal routine. If the decision is to print a token, then at step 52 the token can be printed. The printing operation can of course also continue its normal operation.

While in the preferred embodiment the instructions for the production of the token is provided in the software, the present invention is not so limited. Quite often the printer is connected to a host computer, as illustrated in FIG. 1, that has communication capabilities. For example, most personal computers can be connected to the Internet which in turn allows the personal computer to be connected to any other computer that is also connected to the Internet. Today, most corporations and businesses which manufacture and/or sell printers and consumables for these devices have a home web page which can be accessed through the Internet. Therefore instead of the printer 10 printing the token directly, it is possible that the software in printer 10 is designed to automatically connect to a web page of the original manufacturer or designated seller of authorized replacement parts. In this way the manufacturer or authorized seller may be able to offer the latest offering and/or upgrades of consumables and printer that the user may not have been aware of. The user can also be aware of special promotions being offered, such as trading in the printer for an update version. In addition this method can avoid the need to print any token or promotional discount at the image forming device 10. The user can simply order a new consumable directly from the manufacturer, or seller, for direct shipment to the user or pick-up by the user. FIG. 4 illustrates an example of token that is send to the user upon receiving a message from the image forming device 10 that a particular consumable is low. FIG. 4 merely illustrates the type of consumable that may be offered by identifying it as Component A. The actual component would be provided as the actual date also referred to in FIG. 4. The token is merely an example and may take any appropriate form and offer any desired promotion.

It is to be understood that various other modifications made be made without departing from the scope of the present invention, the present invention being defined by the claims that follow.

PARTS LIST 10 printer/image forming device
12 digital print engine
14 formatter
16 printer controller
18 input
20 software
22 memory
24 microprocessor
25 low level status indicator
26 strip output buffer
27 low level sensor
28 disposable ink cartridge
30 counter
32 token
34 monitor
36 host computer
38 media
40 step
42 step
44 step
46 step
48 step
50 step
52 step

What is claimed is:

1. A method of notifying a user that a particular replaceable consumable may need to be purchased for use with an electronic imaging device, comprising the steps of:
   a. sensing when said replaceable consumable has reached a predetermined condition;
   b. automatically contacting a remote site when replaceable consumable has reached a predetermined condition and communicating this condition to said site;
   c. said site controlling printing a token at said electronic imaging device for the purchase of a new replaceable consumable.

2. A method according to claim 1 wherein said remote site is the manufacture of said imaging device.

3. A method according to claim 1 wherein said remote site is a seller of authorized said new replacement consumable for said imaging device.

4. A method according to claim 1 wherein said remote site advises the user of said imaging device of additional promotions relating to said imaging device and/or said replacement consumable.

5. A computer software product comprising a computer readable storage medium having a computer program which when loaded into a computer of an image forming device causes the computer to perform the following steps:
   a. sensing when said replaceable consumable has reached a predetermined condition;
   b. automatically contacting a remote site when replaceable consumable has reached a predetermined condition and communicating this condition to said site;
   c. said site controlling printing a token at said electronic imaging device for the purchase of a new replaceable consumable.

* * * * *